United States Patent
Moberg (10) Patent No.: US 10,331,107 B2
(45) Date of Patent: Jun. 25, 2019

(54) COMPENSATING ROBOT MOVEMENT DEVIATIONS

(71) Applicant: ABB SCHWEIZ AG, Baden (CH)

(72) Inventor: Stig Moberg, Västerås (SE)

(73) Assignee: ABB Schweiz AG, Baden (CH)

( * ) Notice: Subject to any disclaimer, the term of this patent is extended or adjusted under 35 U.S.C. 154(b) by 150 days.

(21) Appl. No.: 15/301,553

(22) PCT Filed: Apr. 22, 2014

(86) PCT No.: PCT/EP2014/058097
§ 371 (c)(1),
(2) Date: Oct. 3, 2016

(87) PCT Pub. No.: WO2015/161864
PCT Pub. Date: Oct. 29, 2015

(65) Prior Publication Data
US 2017/0108848 A1    Apr. 20, 2017

(51) Int. Cl.
*G05B 19/404* (2006.01)
*B25J 9/16* (2006.01)
*B25J 9/10* (2006.01)

(52) U.S. Cl.
CPC .......... *G05B 19/404* (2013.01); *B25J 9/1005* (2013.01); *B25J 9/1641* (2013.01);
(Continued)

(58) Field of Classification Search
CPC ........ G05B 19/404; G05B 2219/49211; G05B 2219/41127; G05B 2219/41359; G05B 2219/37429; B25J 9/1005; B25J 9/1641
See application file for complete search history.

(56) References Cited

U.S. PATENT DOCUMENTS

| 5,420,490 A | 5/1995 | Jeon |
| 6,539,274 B1 | 3/2003 | Rauth et al. |

(Continued)

FOREIGN PATENT DOCUMENTS

| EP | 2199036 A2 | 6/2010 |
| EP | 2492062 A2 | 8/2012 |

(Continued)

OTHER PUBLICATIONS

International Search Report and Written Opinion of the International Searching Authority Application No. PCT/EP2014/058097 Completed: Dec. 18, 2014; dated Jan. 9, 2015 15 pages.

*Primary Examiner* — Jason Holloway
(74) *Attorney, Agent, or Firm* — Whitmyer IP Group LLC (57) ABSTRACT

A method, device, and computer program product for compensating robot movement deviations caused by a gear box as well as to a robot arrangement including such a device. The device has a drift estimating block configured to obtain motor data ($\dot{q}_r$) and motor torque data ($\tau$) related to the motor, determine a measure of the temperature of the gear box based on the motor data ($\dot{q}_r$) and motor torque data ($\tau$) and estimate the drift ($\Delta q$) based on a drift value of the robot section, the drift value in turn being obtained based on the gearbox temperature measure and a gravitational torque ($\tau_{grav}$) of the motor, and a drift adjusting block (44) configured to adjust a control value ($q_r$) used to control the positioning of the robot based on the estimated drift ($\Delta q$).

13 Claims, 4 Drawing Sheets

(52) U.S. Cl.
CPC ............ *G05B 2219/37429* (2013.01); *G05B 2219/41127* (2013.01); *G05B 2219/41359* (2013.01); *G05B 2219/49211* (2013.01)

(56) References Cited

U.S. PATENT DOCUMENTS

| | | | | |
|---|---|---|---|---|
| 7,872,436 | B2* | 1/2011 | Kock | B25J 9/1641 |
| | | | | 318/568.22 |
| 9,387,586 | B2* | 7/2016 | Collmer | B25J 9/102 |
| 9,579,792 | B2* | 2/2017 | Hietmann | B25J 9/1641 |
| 2007/0260356 | A1* | 11/2007 | Kock | B25J 9/1641 |
| | | | | 700/261 |
| 2009/0076653 | A1* | 3/2009 | Hietmann | B25J 9/1641 |
| | | | | 700/252 |
| 2010/0032242 | A1* | 2/2010 | Lin | F01M 13/00 |
| | | | | 184/6.12 |
| 2014/0034422 | A1* | 2/2014 | Collmer | B25J 9/102 |
| | | | | 184/106 |

FOREIGN PATENT DOCUMENTS

| | | |
|---|---|---|
| JP | 2006285301 A | 10/2006 |
| JP | 2013154433 A | 8/2013 |
| WO | 03051575 A1 | 6/2003 |

* cited by examiner

COMPENSATING ROBOT MOVEMENT DEVIATIONS

TECHNICAL FIELD

The present invention relates to the field of robots. The invention more particularly relates to a method, device, and computer program product for compensating robot movement deviations caused by a gear box as well as to a robot arrangement comprising such a device.

BACKGROUND

A robot section, such as a part of a robot arm is often controlled by a motor, such as a servo motor, together with a gear box.

The control of industrial robots may in theory be so precise that the deviation from a desired position is very small. This allows the robot to perform fine and precise operations.

However, it has been found that the robot movement deviation varies because of the gear box temperature. This means that the movements are not as precise anymore. If a robot is to be used in production, this may lead to unacceptable low quality of the products produced.

Various documents discuss handling of temperature drift in a motor, see for instance U.S. Pat. No. 5,420,490, or in a robot in general, see EP 2199036.

There is in view of this still a need for providing a compensation of the drift caused by temperature variations in a gear box.

SUMMARY

The present invention is therefore directed towards compensating robot movement deviations caused by a gear box connected between a robot section and a motor controlling the movement of the robot section.

This object is according to a first aspect of the present invention achieved through a method for compensating robot movement deviations caused by a gear box connected between a robot section and a motor controlling the movement of the robot section, the method comprising the steps of:
  obtaining motor data of the motor;
  obtaining motor torque data;
  determining a measure of the temperature of the gear box based on the motor data and motor torque data;
  estimating the drift based on a drift value of the robot section, the drift value in turn being obtained based on the gearbox temperature measure and a gravitational torque of the motor; and
  adjusting a control value used to control the positioning of the robot based on the estimated drift.

Another object of the present invention is to provide a device for compensating robot movement deviations caused by a gear box connected between a robot section and a motor controlling the movement of the robot section.

This object is according to a second aspect of the present invention achieved through such a device that comprises:
  a drift estimating block configured to:
  obtain motor data of the motor;
  obtain motor torque data;
  determine a measure of the temperature of the gear box based on the motor data and motor torque data;
  estimate the drift based on a drift value of the robot section, the drift value in turn being obtained based on the gearbox temperature measure and a gravitational torque of the motor; and
  a drift adjusting block configured to adjust a control value used to control the positioning of the robot based on the estimated drift.

The device may be a part of the robot controller for the robot.

Another object of the present invention is to provide a robot arrangement comprising an industrial robot and a device for compensating robot movement deviations caused by a gear box.

This object is according to a third aspect of the present invention achieved through such a robot arrangement where:
  the industrial robot comprises:
    a number of moveable arm sections,
    at least one motor for moving a corresponding arm section,
    a gear box between the motor and the arm section, and
  the device comprises:
    a drift estimating block and drift adjusting block according to the second aspect.

Another object of the present invention is to provide a computer program product for compensating robot movement deviations caused by a gear box connected between a robot section and a motor controlling the movement of the robot section.

This object is according to a fourth aspect of the present invention achieved through a computer program product comprising a data carrier (78) with computer program code which when run in a device for compensating robot movement deviations, causes the device to:
  obtain motor data of the motor;
  obtain motor torque data;
  determine a measure of the temperature of the gear box based on the motor data and motor torque data;
  estimate the drift based on a drift value of the robot section, the drift value in turn being obtained based on the gearbox temperature measure and a gravitational torque of the motor; and
  adjust a control value used to control the positioning of the robot based on the estimated drift.

The present invention has many advantages. It allows a simple and fast compensation of the drift caused by temperature deviations in the gearbox. This improves the operation of the robot, which may perform more precise movements. Furthermore, this improvement can be achieved through program updates in the robot controller. Thereby the additional costs required for implementing the added functionality are low.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
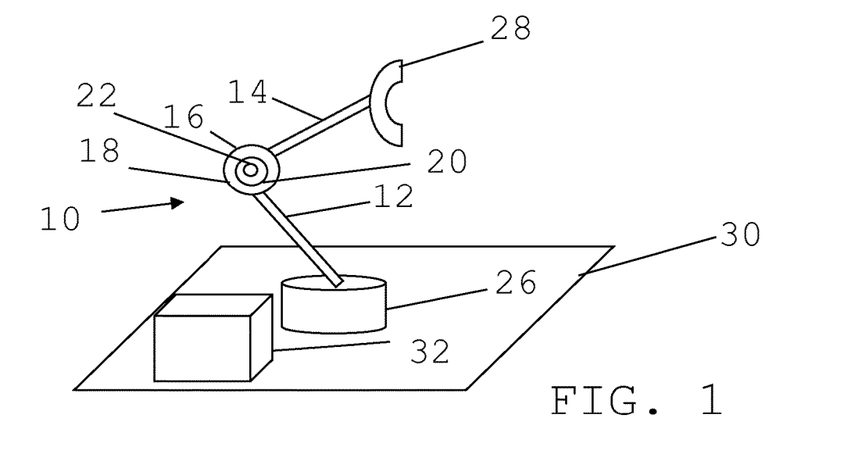
FIG. 1 is schematically shows a robot arrangement comprising a robot and a robot controller,
  FIG. 2 schematically shows a joint of the robot with a gear box and a motor.

FIG. 1 schematically shows a robot arrangement comprising a robot 10 and a robot controller 32. The robot 10 comprises a number of arm sections 12, 14 connected to each other via joints 16. The robot 10 shown in FIG. 1 is simplified and therefore only two arm sections are shown, a first and a second arm section 12 and 14, connected to each other via joint 16. This means that in this example only one joint 16 which joins the first and second arm sections 12 and 14 is shown. It should however be realized that a robot normally comprises many more arm sections, typically six and consequently also several more joints that may be controlled.

The first arm section 12 is here connected to a foundation 26. In this way the robot 10 is attached to the foundation 26. There is normally also a joint joining the first arm section 12 to this foundation 26 for allowing the first arm section 12 to be moved in relation to the foundation 26. Thereby the foundation may provide a first axis of rotation. However, this joint has been omitted from FIG. 1 for the sake of clarity. The robot normally comprises a tool holder for allowing a tool 28 to be connected to the robot 10. Such a tool is typically connected to the outermost arm section of the robot, i.e. to the arm section furthest away from the foundation 26. Consequently, in FIG. 1 one such tool 28 is shown as being attached to the second arm section 14.

In order to move the second arm section 14 in relation to the first arm section 12 there is provided an actuator 22 at the joint 16, which actuator 22 may be implemented as a motor, for instance as a servo motor for moving the second arm around a second axis of rotation defined by the joint 16. Between this actuator and the joint 16 there is furthermore provided a gear box 20.

In some variations it is also possible that there is one or more sensor connected to the joint. Such a sensor could be provided for sensing at least one property, such as a property of the robot, where variations in the property are being caused by the operation of the actuator 22. One possible property being sensed in this way is a position of the robot 10 and more specifically the position of the second arm section 14 in relation to the second axis. Another possible property is the speed of the motor 22. A further possible property is the acceleration of the motor. A further property is the torque of the second arm 14. It is also possible to have a temperature sensor that senses the temperature of the location, i.e. the ambient temperature of the gearbox 20. The sensor may furthermore be placed or mounted on the actuator or the gear box.

Figure 2:
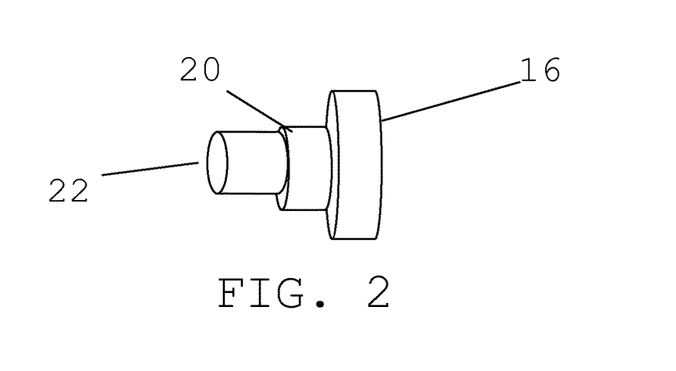

The joint 16, with actuator 22 and gear box 20 is also schematically shown in FIG. 2, which figure shows a perspective view of these elements.

The robot controller 32 is connected to the robot 10 and more particularly to the actuator 22 and if there is a sensor also to this sensor.

Figure 3:
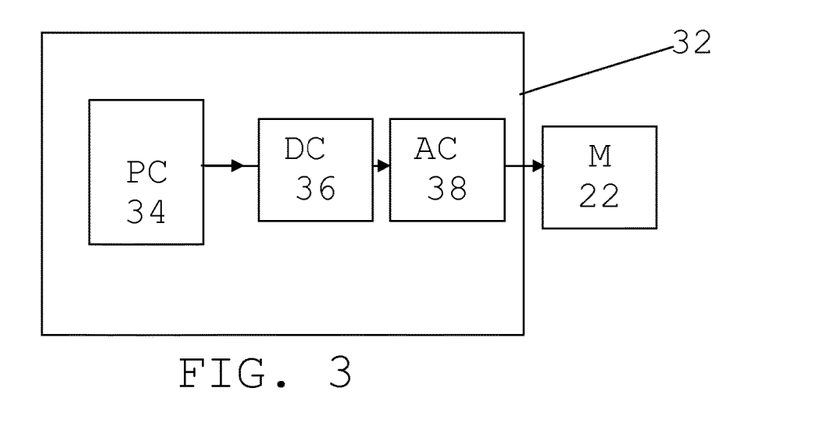
FIG. 3 shows a block schematic of the robot controller being connected to the motor, where the robot controller comprises a path planner unit, a drift compensating unit and a control unit in the, FIG. 4 schematically shows a control diagram for controlling the joint using the gear box and motor, the control diagram comprising the path calculating unit and various control blocks in the drift calculating unit and control unit.

A block schematic of the robot controller 32 connected to the motor 22 is shown in FIG. 3. The robot controller 32 comprises a path planner unit PP 34 connected to a drift compensating unit DC 36. The drift compensating unit 36 is in turn connected to an arm control unit AC 38, which is finally connected to the motor M 22. The drift compensating unit 36 may also be considered to form a device for compensating robot movement deviations caused by a gear box.

Figure 4:
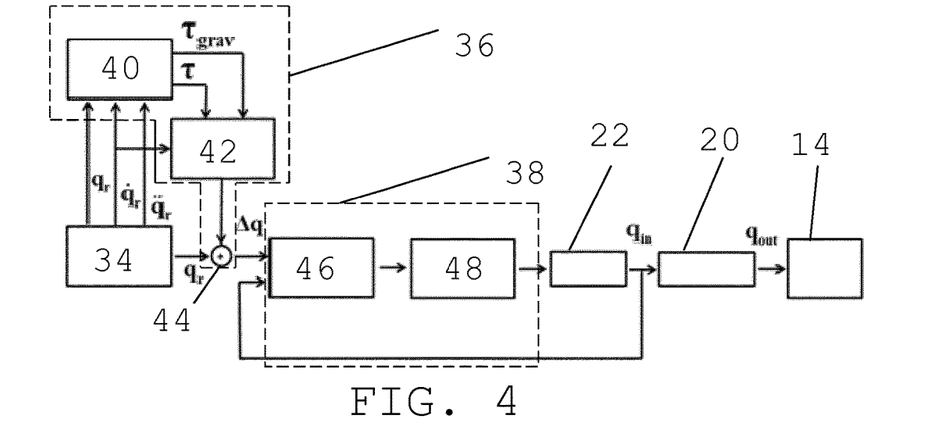

FIG. 4 shows a process control schematic of the path planner unit 34, drift compensating unit 36, arm control unit 38, motor 22, gear box 20 and second arm 14. In FIG. 4 there is also shown blocks of the drift compensating unit 36 and arm control unit 38. The path planner unit 34 provides motor data about the motor. In this case it provides motor data in the form of a desired motor position value $q_r$, a desired motor velocity value $\dot{q}_r$ and a desired motor acceleration value $\ddot{q}_r$ to a dynamic model block 40. The motor velocity value $\dot{q}_r$ is also provided to a drift estimating block 42 of the drift compensating unit 36, which drift estimating block 42 also receives a motor torque value $\tau$ of the motor and a gravitation torque value $\tau_{grav}$ from the dynamic model block 40. The drift compensating unit 36 also comprises a drift adjusting block 44 connected between a signal output of the path planning unit 34 and a first signal input of a position control block 46 of the arm control unit 38. The drift adjusting block 44 receives a drift compensating value $\Delta q$ from the drift estimating block 42 and a position value $q_r$ from the path planning unit 34 and provides the sum of these to the first signal input of the position control block 46 of the arm control unit 38. The position control block 46 also has a signal output connected to a signal input of the torque control block 48, which has a signal output connected to the motor 22. The motor 22 in turn provides a motor position $q_{in}$ to the gear box 20, which controls the robot arm 14 with a positional value $q_{out}$. The motor position $q_{in}$ is also provided in a feedback loop back to a second input of the position control block 46.

The dynamic model block 40 comprises a dynamic model of the robot. Such a model may be used by the pattern planner unit 34. For this reason the dynamic model block 40 may as an alternative be a part of the path planer unit 34 instead of the drift compensating unit 36.

As mentioned earlier, it has shown that there is robot movement deviation variation because of the variations of the gear box temperature. The difference between the gearbox input position (motor position) $q_{in}$ and gearbox output position (joint position) $q_{out}$ may then generally depend on the thermal state of the gearbox 20, i.e., the temperature in different parts of the gearbox 20. If a change of thermal state will cause significant change of the tool position, this can affect the robot application negatively. If for instance the thermal drift in the z direction of the robot is around 0.3 mm and the robot repeatability is specified to be 0.05 mm, then the thermal drift will be interpreted as a repeatability of 0.3 mm. This problem may be increased by the fact that the time constants of the thermal drift may be short (~2 min for increase of temperature, 4 minutes for decrease), and a short stop, e.g., will change tool position significantly. The drift may thus increase faster than it decreases. This problem is handled by the robot movement compensation system of the invention.

Based on motor speed $\dot{q}_r$, total motor torque $\tau$, and gravity torque $\tau_{grav}$, the drift estimating block 42 estimates the drift, and outputs the adjustment $\Delta q$. The drift estimating block 42 may employ a dynamic drift model to estimate the internal temperature of the gear box from speed $\dot{q}_r$ and torque $\tau$. It is not necessary to estimate the temperature as such, but only to obtain a measure of the temperature, which measure has the same behavior as the temperature variation. Knowing the temperature or measure, the drift can then be estimated based on the torque. The model used may be of a grey-box type and calibrated by measuring the drift using an external measurement system.

Figure 5:
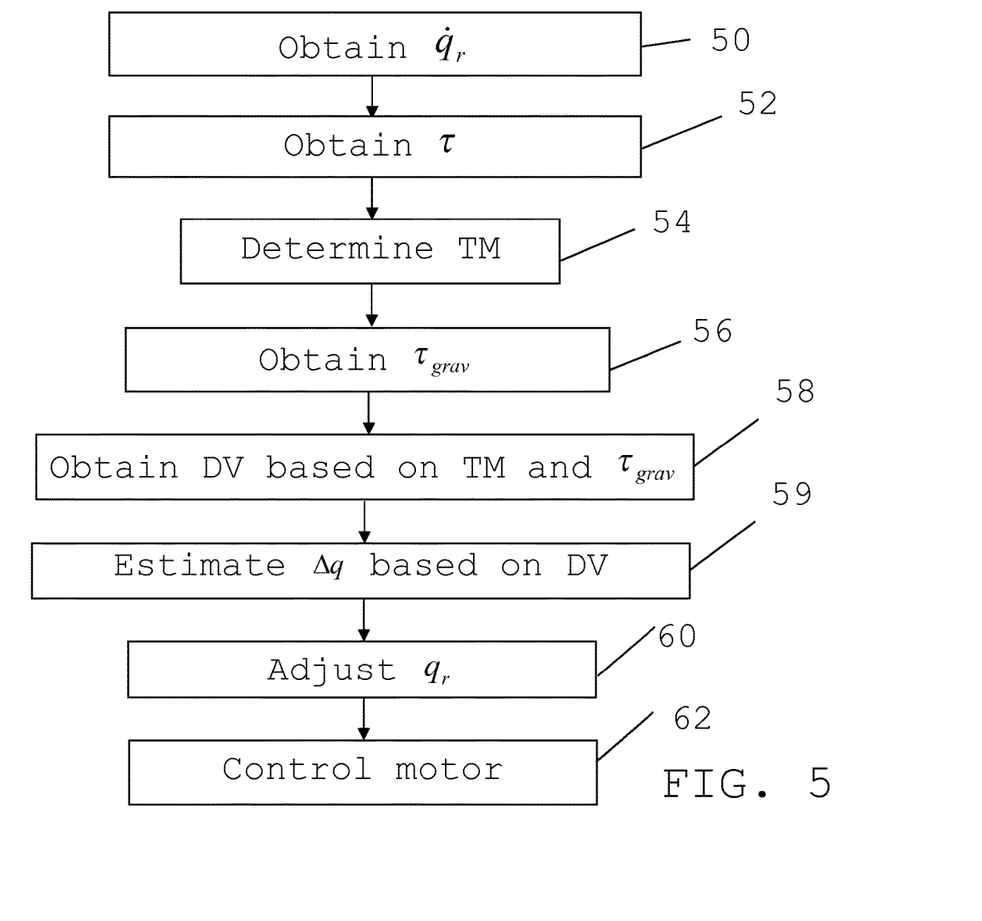
FIG. 5 shows a number of method steps being performed in a method for compensating the drift, FIG. 6 schematically shows a number of control elements provided in the drift compensating unit in order to compensate the drift.

Now a first embodiment will be described with reference also being made to FIG. 5, which shows a flow chart of a number of method steps in a method of compensating robot movement deviation being performed in the compensating unit 36.

The path planning unit 34 determines a movement of the robot, for instance in order to move the robot along a robot path. The path is typically a path in which the tool 28 is to occupy a certain position at different instances of time. In this the path planner unit 34 provides a number of control commands for controlling motors to move corresponding arm sections, which movements together contribute to the desired tool movement. One of the motors being controlled is the motor 22 connected to the joint 16 via the gear box 20 for moving the second arm section 14. The path planning unit 34 provides a control value $q_r$ indicating a desired position of the second arm section 14, such as an angle in relation to the rotational axis defined by the joint 16. This is provided for use in controlling the movement of the second arm 14. The path planning unit 34 also provides a corresponding motor speed value $\dot{q}_r$ and acceleration value $\ddot{q}_r$, where all three values are provided as input to the dynamic model block 40 of the drift compensating unit 36 in order to obtain one or two torque values $\tau$ and $\tau_{grav}$ of the second arm section 14 using the dynamic model of the robot. The values are here the total torque $\tau$ of the motor 22 as well as the gravitational torque $\tau_{grav}$ of the motor. Both these torque values $\tau$ and $\tau_{grav}$ and the motor speed value $\dot{q}_r$ are received by the drift estimating block 42 of the drift compensating unit 36.

The drift estimating block 42 thus obtains motor data about the motor, here in the form of the motor speed $\dot{q}_r$, step 50, as well as motor torque data, here in the form of the total motor torque $\tau$, step 52. Based on these two pieces of data it then determines a measure TM of the temperature of the gear box 20, step 54. After this has been done, the drift estimating block 42 obtains the gravitational torque value $\tau_{grav}$ from the dynamic model block 40, step 56, and thereafter determines a drift value DV based on the temperature measure TM and the gravitational torque $\tau_{grav}$, step 58. The drift value is thus being obtained based on the gearbox temperature measure TM and the gravitational torque $\tau_{grav}$ of the motor. The drift estimating block 42 then estimates a drift $\Delta q$ based on the drift value DV, step 59. The drift value DV is thereby used for obtaining an estimate of the drift $\Delta q$. As the drift value DV depends on the temperature measure TM and the gravitational torque $\tau_{grav}$, it is clear that also the estimated drift $\Delta q$ depends on the temperature measure TM and the gravitational torque $\tau_{grav}$. In some variations the drift value DV is used as the estimated drift $\Delta q$. In other variations it is processed for obtaining the estimated drift $\Delta q$. The estimated drift $\Delta q$ is then provided to the drift adjusting block 44 for being subtracted from the control value $q_r$, and in this way the drift adjusting block 44 adjusts the control value $q_r$, step 60. It thus adjusts the control value $q_r$ that is used to control the positioning of the robot based on the estimated drift. This estimated drift $\Delta q$ thus compensates for the drift in the gear box output signal $q_{out}$.

The adjusted control value is then provided to the position control block 46 of the arm control unit 38, which after further processing delivers a process control signal to the torque control block 48, which in turn further processes the signal for providing as a control command to the motor 22, step 62. The motor 22 then controls the position of the arm section 14 with a position $q_{in}$, which is translated by the gear box 20 to a position $q_{out}$ for controlling the arm section 14. Here the motor position $q_{in}$ is also fed back to the position control block 46 in a feedback control loop.

It should be realized that the operation of the position control block 46, torque control block 48 in relation to the motor 22 and gear box 20 is conventional and as such known. However the control values employed have been adjusted so that the effects of the drift of the gear box have been considered.

Furthermore, in the described embodiment the adjustment is a feed forward adjustment, which provides a fast compensation of the drift.

One specific way in which the estimated drift could be obtained will now be described in relation to FIG. 6.

Figure 6:
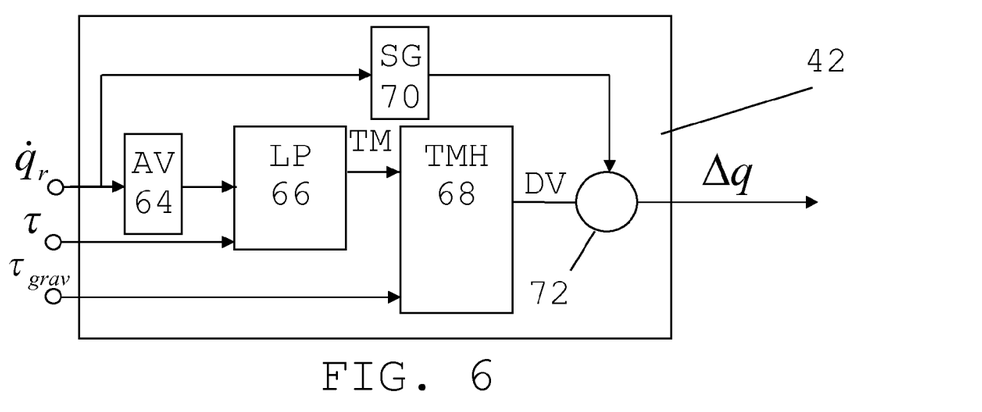

FIG. 6 shows a block schematic of one realization of the drift estimating block 42. It comprises a first signal processing branch comprising an optional absolute value forming element AV 64 with an input that receives the motor speed $\dot{q}_r$. The absolute value forming element AV 64 also has an output that is connected to a first input of a temperature dependent measure forming element.

The temperature dependent measure forming element may be a dynamic model of grey box—black box type that uses motor speed and optionally also motor torque to determine or estimate a measure of the gear box temperature. In this first embodiment the temperature dependent measure forming element is in the form of a low pass filter LP 66, which in turn has an output connected to the input of a temperature measure handling element 68. There is also a second optional signal processing branch in parallel with the first signal processing branch. The second signal processing branch comprises a sign determining element 70 having an input that also receives the motor speed $\dot{q}_r$. The sign determining element 70 is connected to a multiplying element 72, which is also connected to an output of the temperature measure handling element 68 and thereby it interconnects the first and second signal processing branches.

As mentioned earlier there is determined a measure TM of the temperature based on the speed $\dot{q}_r$ and the motor torque $\tau$. This measure TM may be determined using the low pass filter 66. It is here possible that the motor speed $\dot{q}_r$ is directly used as an input signal to the low pass filter 66. However, in the example given in FIG. 6 the motor speed is supplied to the absolute value forming element 64, which determines the absolute value $|\dot{q}_r|$ of the speed for input to the low pass filter 66. The low pass filter 66 then filters the absolute value $|\dot{q}_r|$ of the speed. The low pass filtering thus involves filtering using the low pass filter 66.

In this filtering the filter coefficients may be set based on the change of the motor speed values being input. As an example these coefficients may be set in the following way:

If input(t)>output(t−1)
Set coeff_1 and coeff_2 for heating;
else
Set coeff_1 and coeff_2 for cooling;
end
output(t)=coeff_1*input(t)+coeff_2*output(t−1)

This means that the output TM at time t may be determined from the input, i.e. (absolute) speed, at time t and the output at a previous time (t−1), where t−1 and t are two consecutive sampling times.

The filter characteristics, i.e. the coefficients coeff1 and coeff2 for heating and cooling may be set according to the time evolution of a pre-measured drift value for a specific gravity torque.

The result of this filtering is the temperature measure TM, which is supplied to the temperature measure handling element 68. The temperature measure handling element 68 applies the temperature measure TM and gravitational torque $\tau_{grav}$ on known relationships between drift value DV, temperature measure TM and gravitational torque $\tau_{grav}$ in order to obtain a drift value. For this reason the temperature measure handling element 68 may comprise pre-measured drift values, which drift values have been measured for different known combinations of gravitational torque and temperature measure TM. The pre-measured drift values may be provided in the form of curves or equations outlining the dependency between the drift value DV and gravitational torque $\tau_{grav}$. Here a curve or an equation may set out the dependency of gravitational torque $\tau_{grav}$ and drift value DV for a specific temperature measure TM. There may thus be number of equations or graphs, one for each different temperature measure TM. The pre-measured drift values may as an alternative be provided in the form of one or more tables. A table may comprise drift values depending on different temperature measure TM and gravitational torque values. A drift value may then be a table entry that is identified by the corresponding temperature measure and gravitational torque values in the columns and rows of the table.

If there is no table entry, graph or equation for a specific temperature measure TM or a specific gravitational torque value $\tau_{grav}$, then interpolation of drift values obtained for at least two different temperature measures or gravitational torque values $\tau_{grav}$ may be used. In this way a drift value DV may be obtained, which as was mentioned earlier may be used as the estimated drift Δq.

As mentioned earlier the absolute value $|\dot{q}_r|$ of the speed may be used for compensating the drift. This can be used to obtain a drift value that is independent of the direction of movement. In order to also consider the direction of the movement, it is possible to use the second signal processing branch. In this case the motor speed $\dot{q}_r$ is provided to the sign determining element 70, which determines the sign of the speed $\dot{q}_r$. This sign, which is thus a positive or a negative value, is then provided to the multiplying element 72 where it is multiplied with the drift value DV obtained from the temperature measure handling element 68. Thereby the sign of the speed $\dot{q}_r$ is multiplied with the drift value DV and the product is provided as the estimated drift Δq.

As an alternative it is possible that two drift estimating blocks 42 are connected in parallel, where one is provided with the second signal processing branch and the other lacks such a branch, where the output of these block are added to each other in order to obtain a total compensation that comprises both movement direction dependent and movement direction independent drift compensating components. In this case the other drift estimating block thus lack sign determining element and there is an adding unit for adding the drift values obtained from the two drift estimating blocks to each other in order to obtain the estimated drift.

This allows a simple and fast compensation of the drift caused by temperature deviations in the gearbox.

Figure 7:
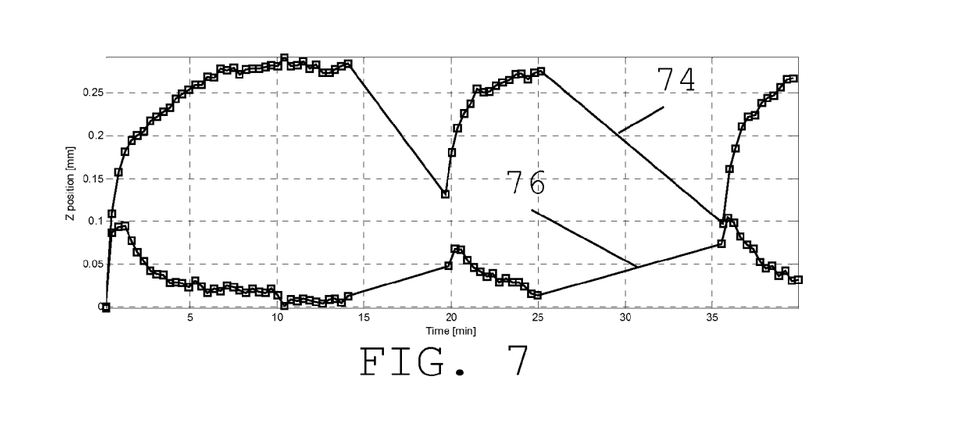
FIG. 7 shows a curve of a comparison of the drift with and without compensation, and FIG. 8 schematically shows a kinematic model that may be used for determining torque.
Figure 8:
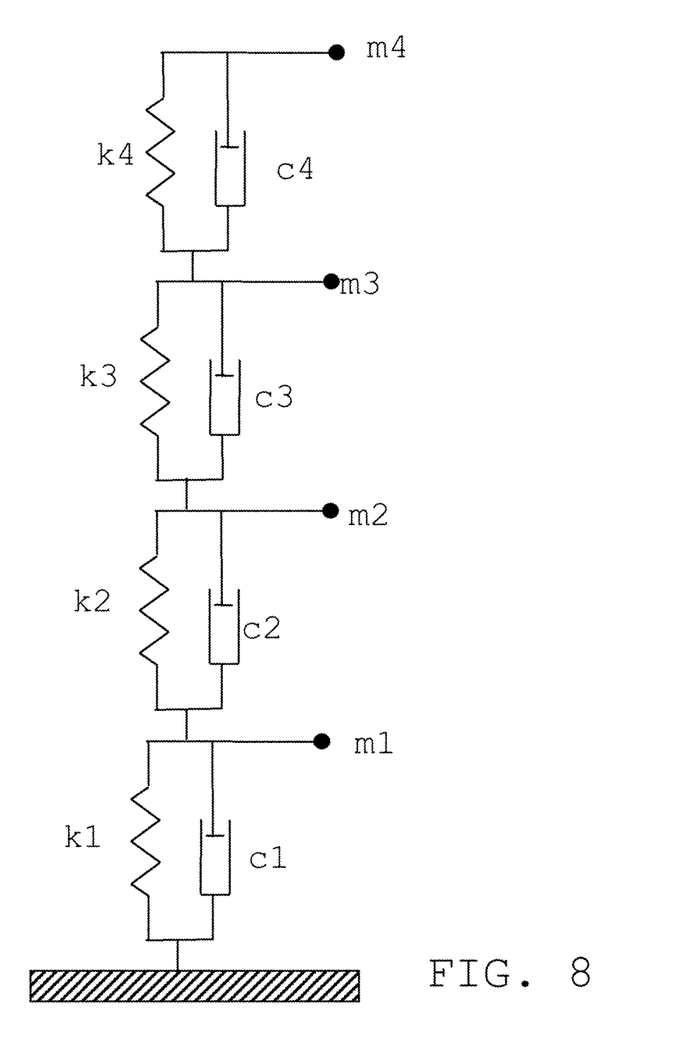

The improvement can be readily observed from FIG. 7, which shows a curve 74 of the deviation without compensation and a curve 76 of the deviation with compensation. It can be seen that a considerable improvement is obtained. It can also be seen from curve 74 that the slope of the drift for rising temperatures is higher than the slope of the drift for falling temperatures.

In the examples given above estimated position, speed, and torques were used. It should be realized that as an alternative measured position, speed, and torque could be used. These could be obtained with the use of the one or more previously mentioned sensors. In this case there would be no need for the use of a dynamic model and consequently also no need for the dynamic model block. Furthermore, in this case the drift estimating block 42 could with advantage be placed in a feedback control path. It is also possible to use temperature sensors (e.g. an ambient temperature sensor) in order to provide a possible improvement of the compensation.

If there are drift components that are better modelled as a translation of the gearbox, or a rotation in other directions than the output direction, these components could be compensated for in the same way as described here. The difference is that, e.g. a translational drift, must be compensated by more than one joint position. This means that kinematics may have to be used to translate drift to motor position compensation.

As mentioned earlier, the torques may be estimated through the use of a dynamic model of the robot. This model maybe a rigid body dynamic model of the robot where all position, speed and acceleration dependent torques for a rigid robot are determined based on information about position, speed and acceleration. The position dependent torque is gravity and the sum of all torques is the total torque.

As the drift compensating unit may be considered to form a device for compensating robot movement deviations caused by a gear box, it is clear that the dynamics model block may be omitted from the device. In one variation only the drift compensating unit is such a device. Furthermore it is possible that one or more of the other units of the robot controller may be included in the device for compensating robot movement deviations caused by the gear box. It is for instance possible that the whole robot controller is considered to be such a device.

Figure 9:
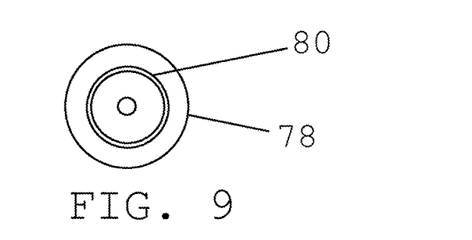
FIG. 9 schematically shows a computer program product in the form of a CD Rom disc comprising computer program code for compensating drift.

The different units of the robot controller and thus also the drift compensating unit 36 may be provided in the form of one or more processors together with computer program memory including computer program code for performing the functions of these units. As an alternative they may be provided in the form of one or more Application Specific Integrated Circuits (ASIC) or Field-Programmable Gate Arrays (FPGA). This computer program code may also be provided on one or more data carriers which perform the functionality of the robot controller and especially of the drift compensating unit when the program code thereon is being loaded in a computer forming the robot controller. One such data carrier 78 with computer program code 80, in the form of a CD ROM disc, is schematically shown in FIG. 9. Such computer program may as an alternative be provided on a server and downloaded therefrom into the computer forming the parameter determining device.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

The invention claimed is:

1. A method for compensating robot movement deviations caused by a gearbox connected between a robot section and a motor controlling the movement of the robot section, the method comprising the steps of:
   obtaining motor data of the motor;
   obtaining motor torque data;
   determining a temperature measure of the gearbox based on the motor data and motor torque data, said determining the gearbox temperature measure includes low pass filtering the motor data, where the result of filtering is the gearbox temperature measure;
   estimating a drift compensation based on a drift value of the robot section, said drift value being obtained based on the gearbox temperature measure and a gravitational torque of the motor by applying the gearbox temperature measure and the gravitational torque in known relationships between drift value, temperature measure, and gravitational torque; and
   adjusting a control value used to control the positioning of the robot based on the estimated drift compensation.

2. The method according to claim 1, wherein low pass filtering comprises low pass filtering the absolute value of the motor data.

3. The method according to claim 2, further comprising determining the sign of the motor data and multiplying the drift value with the sign of the motor data in order to obtain the estimated drift.

4. The method according to claim 1, wherein the drift value is the estimated drift.

5. The method according to claim 1, wherein the motor data comprises the velocity of the motor movement.

6. The method according to claim 1, wherein motor data comprises motor position and the gravitational torque is obtained through employing the motor position in a dynamic model of the robot.

7. A device for compensating robot movement deviations caused by a gearbox connected between a robot section and a motor controlling the movement of the robot section, the device comprising:
   at least one drift estimating block configured to:
      obtain motor data of the motor;
      obtain motor torque data;
      determine a temperature measure gearbox based on the motor data and the motor torque data;
      estimate a drift compensation based on a drift value of the robot section, said drift value being obtained based on the gearbox temperature measure and a gravitational torque of the motor;
   the drift estimating block having a temperature dependent measure forming element configured to determine the gearbox temperature measure through low pass filtering the motor data, where the result of the filtering is the gearbox temperature measure;
   the drift estimating block having a temperature measure handling element configured to obtain the drift value by applying the gearbox temperature measure and the gravitational torque in known relationships between drift value, temperature measure, and gravitational torque; and
   a drift adjusting block configured to adjust a control value used to control the positioning of the robot based on the estimated drift compensation.

8. The device according to claim 7, wherein the drift estimating block comprises an absolute value forming element connected to the temperature dependent measure forming element in order for the temperature dependent measure forming element to low pass filter the absolute value of the motor data.

9. The device according to claim 8, wherein the drift estimating block further comprises a sign determining element configured to determine the sign of the motor data and a multiplying element configured to multiply the drift value with the sign of the motor data in order to obtain the estimated drift compensation.

10. The device according to claim 9, further comprising:
    a second drift estimating block without a sign determining element; and
    an adding unit configured to add the estimated drift compensations from the two drift estimating blocks in order to obtain a total estimated drift compensation.

11. The device according to claim 7, wherein the motor data comprises motor position, and the device further comprises a dynamic model block configured to obtain the gravitational torque through applying the motor position in a dynamic model of the robot.

12. A robot arrangement comprising an industrial robot and a device for compensating robot movement deviations,
    the industrial robot including:
       a number of moveable arm sections,
       at least one motor for moving a corresponding arm section, and
       a gearbox between the motor and the arm section,
    the device for compensating robot movement deviations including:
       a drift estimating block configured to obtain motor data of the motor, obtain motor torque data, determine a temperature measure of the gearbox based on the motor data and the motor torque data, and estimate a drift compensation based on a drift value of the robot section, said drift value being obtained based on the gearbox temperature measure and a gravitational torque of the motor,
       the drift estimating block having a temperature dependent measure forming element configured to determine the gearbox temperature measure through low pass filtering the motor data, where the result of the filtering is the gearbox temperature measure,
       the drift estimating block having a temperature measure handling element configured to obtain the drift value by applying the gearbox temperature measure and the gravitational torque in known relationships between drift value, temperature measure, and gravitational torque, and a drift adjusting block configured to adjust a control value used to control the positioning of the robot based on the estimated drift compensation.

13. A non-transitory computer program product for compensating robot movement deviations caused by a gearbox connected between a robot section and a motor controlling the movement of the robot section, the computer program product comprising a data carrier with computer program code which when run in a device for compensating robot movement deviations, causes the device to:
- obtain motor data of the motor;
- obtain motor torque data;
- determine a temperature measure of the gearbox based on the motor data and motor torque data, said determining the gearbox temperature measure includes low pass filtering the motor data, where the result of the filtering is the gearbox temperature measure;
- estimate a drift compensation based on a drift value of the robot section, said drift value being obtained based on the gearbox temperature measure and a gravitational torque of the motor by applying the gearbox temperature measure and the gravitational torque in known relationships between drift value, temperature measure, and gravitational torque; and
- adjust a control value used to control the positioning of the robot based on the estimated drift compensation.

* * * * *